United States Patent [19]

Farrall et al.

[11] Patent Number: 5,057,750
[45] Date of Patent: Oct. 15, 1991

[54] TWO-STAGE RESONANT STARTING CIRCUIT FOR AN ELECTRODELESS HIGH INTENSITY DISCHARGE LAMP

[75] Inventors: George A. Farrall, Rexford; John P. Cocoma, Clifton Park, both of N.Y.

[73] Assignee: General Electric Company, Schenectady, N.Y.

[21] Appl. No.: 622,246

[22] Filed: Dec. 4, 1990

[51] Int. Cl.$^5$ ............................................. H05B 41/16
[52] U.S. Cl. ................................. 315/248; 315/344; 313/234
[58] Field of Search ................... 315/248, 39, 344, 85, 315/348, 267; 313/234

[56] References Cited

U.S. PATENT DOCUMENTS

| | | | |
|---|---|---|---|
| 4,810,938 | 3/1989 | Johnson et al. | 315/248 |
| 4,812,702 | 3/1989 | Anderson | 313/153 |
| 4,894,589 | 1/1990 | Borowiec | 315/248 |
| 4,894,590 | 1/1990 | Witting | 315/248 |
| 4,902,937 | 2/1990 | Witting | 315/248 |
| 4,959,584 | 9/1990 | Anderson | 313/160 |

Primary Examiner—Eugene R. LaRoche
Assistant Examiner—A. Zarabian
Attorney, Agent, or Firm—Jill M. Breedlove; James C. Davis, Jr.; Marvin Snyder

[57] ABSTRACT

A starting circuit for an electrodeless HID lamp provides a two-stage resonant starting signal to a gas probe starter of the type comprising a starting chamber which contains a relatively low-pressure gas and is attached to the outer wall of the arc tube. The starting circuit comprises a resonant LC circuit of variable impedance including the series combination of a variable inductance and the parasitic capacitance between the gas probe starter and the excitation coil. In operation, the resonant circuit is tuned to a predetermined value so that, upon application of an RF signal to the excitation coil, resonant operation of the starting circuit results in the application of a sufficiently high starting voltage to the starting chamber to ignite a low-current glow discharge therein. Once the glow discharge is ignited, the starting circuit is retuned to ensure that a sufficiently high starting voltage is capacitively coupled to the arc tube to ionize the arc tube fill and initiate an arc discharge therein.

21 Claims, 8 Drawing Sheets

TWO-STAGE RESONANT STARTING CIRCUIT FOR AN ELECTRODELESS HIGH INTENSITY DISCHARGE LAMP

RELATED PATENT APPLICATIONS

This patent application is related to commonly assigned U.S. patent application of J. T. Dakin et al., entitled "A Starting Air for an Electrodeless HID Lamp", Ser. No. 622,026 (docket no. LD-10,087), and to commonly assigned U.S. patent application to V. D. Roberts et al., entitled "Gas Probe Starter for an Electrodeless High Intensity Discharge Lamp", Ser. No. 622,247 (docket no. RD-19,981), and to commonly assigned U.S. patent application of J. P. Cocoma et al., entitled "Starting Circuit for an Electrodeless High Intensity Discharge Lamp", Ser. No. 622,024 (docket no. RD-20,228), which patent applications are filed concurrently herewith and incorporated by reference herein.

FIELD OF THE INVENTION

The present invention relates generally to electrodeless high intensity discharge (HID) lamps and, more particularly, to a starting circuit for such a lamp.

BACKGROUND OF THE INVENTION

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. One way to overcome this shortcoming is to lower the gas pressure of the fill, for example, by first immersing the arc tube in liquid nitrogen so that the gas temperature is decreased to a very low value and then allowing the gas temperature to increase. As the temperature rises, an optimum gas density is eventually reached for ionization, or breakdown, of the fill to occur so that an arc discharge is initiated. However, the liquid nitrogen method of initiating an arc discharge is not practical for widespread commercial use.

More recent methods for starting electrodeless HID lamps entail using starting aids to capacitively couple the high voltage developed across the excitation coil turns into the arc tube. As a result of this voltage gradient, a capacitive current flows between the starting aid and the excitation coil, and hence through the arc tube, thereby ionizing the gaseous fill and producing a low current glow discharge therein. When the gas is sufficiently ionized, a transition is made from a relatively low current glow discharge to a relatively high current, high intensity solenoidal arc discharge. Such a starting aid may comprise, for example, a pair of capacitive starting electrodes, as described in U.S. Pat. No. 4,902,937 of H. L. Witting, issued Feb. 20, 1990, and assigned to the instant assignee, which patent is hereby incorporated by reference. Each starting electrode comprises a conductive ring which surrounds the arc tube and is connected to the excitation coil of the HID lamp. Coupling a high voltage signal between the pair of starting electrodes causes an electric field to be produced therebetween which is of sufficient magnitude to create a glow discharge in the arc tube due to the arc tube wall capacitance. Furthermore, as it has been determined that the application of relatively large electric fields directly to the arc tube via the starting aid may cause early arc tube degradation, heat sensitive members, e.g. bimetallic strips, are utilized for moving the starting electrodes away from the arc tube after initiating an arc discharge, thereby preserving the useful life of the lamp.

A spiral starting electrode for an electrodeless HID lamp is described in U.S. Pat. No. 4,894,590 of H. L. Witting, issued Jan. 16, 1990, and assigned to the instant assignee, which patent is hereby incorporated by reference. A single, conical-spiral-shaped starting electrode is positioned so that its narrower end is adjacent to, or on, the arc tube surface. The wider end of the starting electrode is positioned so that flux generated by the excitation coil cuts the turns of the spiral electrode, thereby generating a high voltage signal which results in a sufficiently high electric field gradient to create a glow discharge in the arc tube. A bimetallic strip is utilized to move the starting electrode away from the arc tube after an arc discharge is initiated therein.

Starting electrodes which are moved from a rest position to a starting location adjacent to the arc tube by piezoelectric means are described in U.S. Pat. No. 4,894,589 of J. C. Borowiec, issued Jan. 16, 1990, and assigned to the instant assignee, which patent is hereby incorporated by reference. The piezoelectric means is deactivated after an arc discharge is initiated, and the starting electrodes are moved back to the rest position. The piezoelectric means allows selective movement of the starting electrodes, thereby enabling the lamp to be restarted, if necessary, even if the arc tube is still hot.

In commonly assigned, copending U.S. patent application of H. L. Witting, Ser. No. 417,404, filed Oct. 5, 1989, another starting aid for an electrodeless HID lamp is described which comprises a first conductive coil disposed about a second conductive coil, each coil having a truncated-cone shape. The coils are wound in opposite directions so that voltages induced therein add together to provide a sufficiently high electric field gradient to initiate an arc discharge in the arc tube. A bimetallic support is used to move the starting aid between a starting position adjacent to the arc tube and a lamp-operating position at a predetermined location away from the arc tube. The Witting application is hereby incorporated by reference.

Although each of the hereinabove described movable starting aids is effective in initiating an arc discharge in an electrodeless HID lamp, it is desirable in some applications to employ a fixed starting electrode. To be practical, such a fixed starting electrode must include means for avoiding the application of large electric fields to the arc tube during normal lamp operation so as not to reduce the useful life of the arc tube. Recently developed fixed starting aids for electrodeless HID lamps include a starting chamber containing a gas, preferably at a low pressure relative to that of the arc tube fill, which chamber is attached to the outer surface of the arc tube. One such starting aid, hereinafter referred to a gas probe starter, is the subject of Roberts et al. U.S. patent application, Ser. No. 622,247 (docket no. RD-19,981), cited hereinabove. As described in the Roberts et al. application, a starting voltage is applied by a starting circuit to a starting electrode that is coupled to the starting chamber, causing the low-pressure gas in the chamber to become conductive. As a result, a sufficiently high voltage is applied to the arc tube to ionize the gaseous fill in the arc tube, thus forming an arc discharge therein. After the lamp has started, the starting voltage is removed from the starting electrode in order to extinguish the discharge current in the chamber which would otherwise have a detrimental effect on the arc tube wall. Another type of gas probe starter is described in Duffy et al. patent application, Ser. No. 622,026 (docket LD-10,087), cited hereinabove.

A suitable starting circuit for applying a starting voltage to either a fixed or movable starting aid is described in commonly assigned U.S. patent application of S. A. El-Hamamsy and R. J. Thomas, Ser. No. 527,500, filed May 23, 1990, which is incorporated by reference herein. The starting circuit of the El-Hamamsy and Thomas application comprises a high-efficiency power supply, including a tuned output circuit, for providing an RF signal to the starting electrode. Exemplary high-efficiency power supplies useful in the El-Hamamsy and Thomas starting circuit comprise Class-D and Class-E power amplifiers. The starting circuit operates at a higher frequency than that used to operate the lamp ballast which drives the excitation coil. In this way, the starting circuit is independent of the lamp ballast circuit and, therefore, does not interfere with the operation thereof.

Although the starting circuit of the El-Hamamsy and Thomas application is effective in initiating an arc discharge in an HID lamp, it may be desirable in some applications to simplify the starting circuitry of an HID lamp even further by, for example, eliminating the need for an additional power supply and employing only minimal active circuit components. In the patent application of J. P. Cocoma et al., Ser. No. 622,024 (docket RD-20,228), cited hereinabove, a passive starting circuit is described wherein a series resonant circuit is tuned to provide a starting voltage substantially simultaneously with the application of power to the excitation coil from the main power source. In relatively low-energy circuits, however, for lamp systems employing a gas probe starter, for example, the starting voltage may be insufficient to initiate the arc discharge in the lamp fill after ignition of the glow discharge in the starting chamber.

OBJECTS OF THE INVENTION

Accordingly, an object of the present invention is to provide a new and improved starting circuit for initiating an arc discharge in an electrodeless HID lamp.

Another object of the present invention is to provide a starting circuit for an electrodeless HID lamp system, including a gas probe starter, which employs two stages of resonant operation to ensure that a sufficiently high starting voltage is coupled to the lamp fill to initiate an arc discharge therein.

Still another object of the present invention is to provide a starting circuit for initiating an arc discharge in an electrodeless HID lamp, which starting circuit is driven by the main RF power supply and, hence, does not require an additional, separate power supply.

SUMMARY OF THE INVENTION

These and other objects of the present invention are achieved in a starting circuit for an electrodeless HID lamp which provides a two-stage resonant starting signal to a gas probe starter of the type comprising a starting chamber which contains a relatively low-pressure gas and is attached to the outer wall of the arc tube. The starting circuit comprises a resonant LC circuit of variable impedance including the series combination of a variable inductance and the parasitic capacitance between the starting probe and the excitation coil.

In operation, the resonant circuit is tuned to a predetermined value so that, upon application of an RF signal to the excitation coil, resonant operation of the starting circuit results in the application of a sufficiently high starting voltage to the starting chamber to ignite a relatively low-current glow discharge therein. Once the glow discharge is ignited, the impedance of the starting circuit changes due to the additional capacitance of the glow discharge. Hence, to ensure initiation of the arc discharge in the arc tube fill, the starting circuit of the present invention includes retuning means for retuning the resonant circuit after initiation of the glow discharge. As a result, a sufficiently high starting voltage is capacitively coupled from the starting chamber to the arc tube to ionize the arc tube fill and initiate an arc discharge therein.

In one preferred embodiment of the starting circuit of the present invention, a fixed inductor is coupled in parallel with a dynamically-varying tuning capacitor, the capacitance of which is automatically varied during lampstarting. Initially, the capacitor is tuned to ignite the glow discharge in the starting chamber. Thereafter, since the impedance of the starting circuit changes as a result of the presence of the glow discharge, the capacitor is automatically tuned again. Such two-stage resonant operation advantageously ensures that the starting voltage is sufficient to initiate the arc discharge after ignition of the glow discharge. Furthermore, if desired, a switch, or a parallel combination of a switch and an additional resonant circuit, may be coupled in series with the inductor to ensure suppression of the glow discharge in the low-pressure starting chamber by detuning the starting circuit after initiation of the arc discharge. By extinguishing the glow discharge, the flow of leakage currents between the low-pressure discharge chamber and the arc tube, which would otherwise eventually have a detrimental effect on the arc tube wall, is avoided.

In another preferred embodiment of the starting circuit of the present invention, the tuning capacitor comprises a series combination of two capacitors, one of the two capacitors being coupled in parallel with a switch. Initially, the switch is closed, with the circuit being tuned to ensure a sufficiently high starting voltage to ignite a glow discharge in the low-pressure chamber. After the glow discharge has been ignited, and hence the impedance of the starting circuit has been changed, the switch is opened to achieve a second resonance and thus a sufficiently high starting voltage to ensure initiation of the arc discharge in the arc tube. If desired, a switch, or a parallel combination of a switch and an additional resonant circuit, may be coupled in series with the inductor to ensure suppression of the glow discharge in the low-pressure starting chamber after initiation of the arc discharge, as described hereinabove.

In still other alternative embodiments of the two-stage resonant starting circuit of the present invention, a fixed capacitor is coupled in parallel with a tuning inductor which comprises a fixed inductor coupled in series with the parallel combination of either another capacitor and a switch or another inductor and a switch. Initially, the switch is closed, with the circuit being tuned to ensure a sufficiently high starting voltage to ignite a glow discharge in the low-pressure starting chamber. After the glow discharge has been ignited, and hence the impedance of the starting circuit has been changed, the switch is opened to achieve a second resonance and thus a sufficiently high starting voltage to ensure initiation of the arc discharge in the arc tube. If desired, a switch, or a parallel combination of a switch and an additional resonant circuit, may be coupled in series with the tuning inductor to ensure suppression of the glow discharge in the low-pressure starting chamber after initiation of the arc discharge, as described hereinabove.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
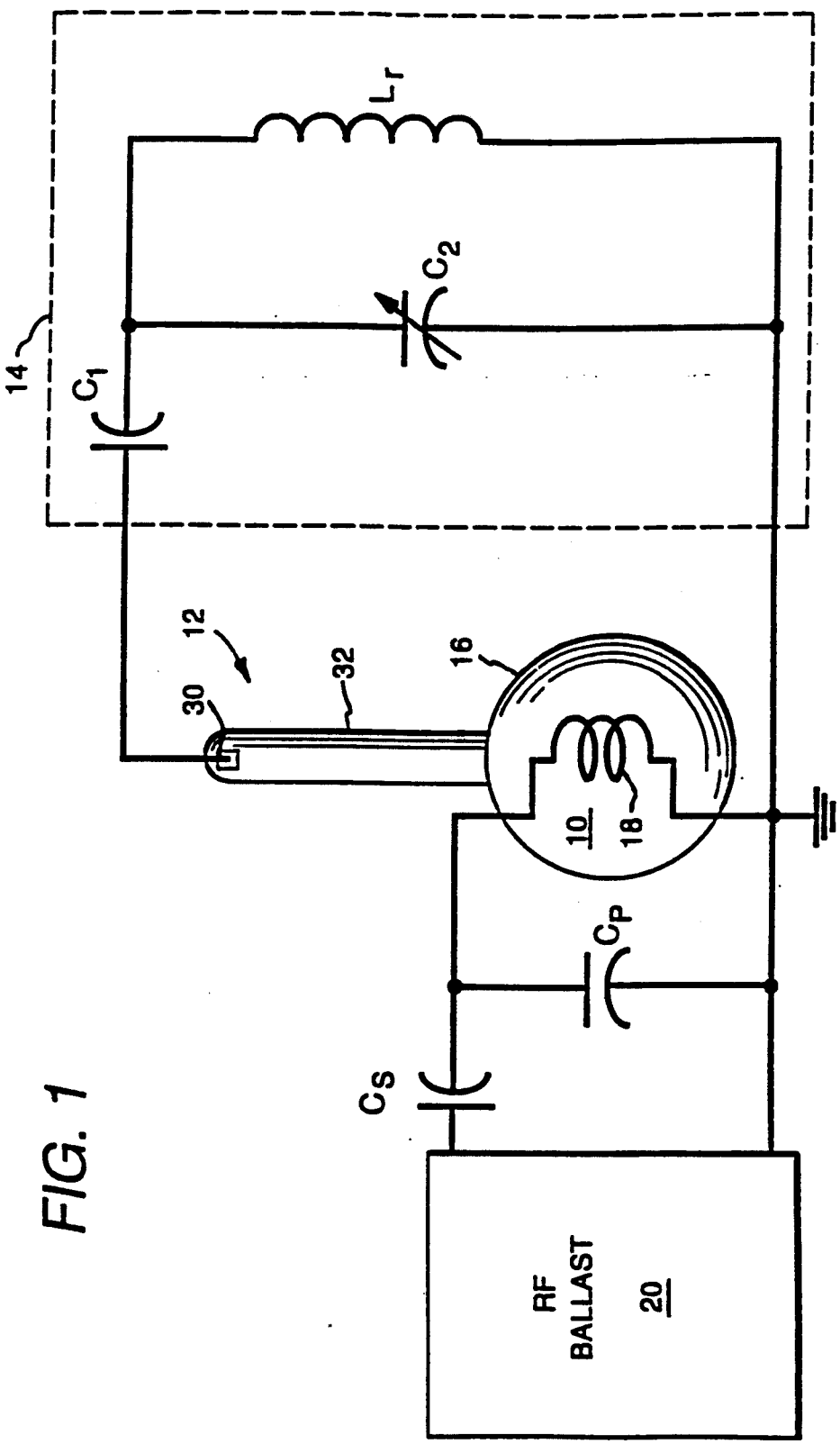
FIG. 1 is a schematic illustration of an electrodeless HID lamp system employing a gas probe starter and a starting circuit employing a dynamically variable capacitor in accordance with a preferred embodiment of the present invention.

FIG. 1 illustrates an HID lamp system, including an electrodeless HID lamp 10 employing a gas probe starter 12 coupled to a starting circuit 14 in accordance with a preferred embodiment of the present invention. Lamp 10 includes a light-transmissive arc tube 16 preferably formed of a high temperature glass, such as fused quartz, or an optically transparent ceramic, such as polycrystalline alumina. An excitation coil 18 surrounds arc tube 16 and is coupled to a radio frequency (RF) ballast 20 for exciting an arc discharge in a fill contained within the arc tube. For clarity of illustration, however, excitation coil 18 is not shown in its operational position about arc tube 16, but is shown only schematically in FIG. 1.

A suitable arc tube fill, described in U.S. Pat. No. 4,810,938 of P. D. Johnson, J. T. Dakin and J. M. Anderson, issued on Mar. 7, 1989 and assigned to the present assignee, comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. The Johnson et al. patent is hereby incorporated by reference. Another suitable fill is described in copending U.S. patent application of H. L. Witting, Ser. No. 348,433, filed May 8, 1989, and assigned to the instant assignee, which patent application is hereby incorporated by reference. The fill of the latter Witting application comprises a combination of a lanthanum halide, a sodium halide, a cerium halide and xenon or krypton as a buffer gas; for example, a fill according to the Witting application may comprise a combination of lanthanum iodide, sodium iodide, cerium iodide, and 250 torr partial pressure of xenon.

An exemplary excitation coil 18 is described in commonly assigned, copending U.S. patent application of G. A. Farrall, Ser. No. 493,266, filed Mar. 14, 1990, which is incorporated by reference herein. The overall shape of the excitation coil of the Farrall application, Ser. No. 493,266, is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J. M. Anderson, issued Mar. 14, 1989, which patent is hereby incorporated by reference. In particular, the Anderson patent describes a coil having six turns which are arranged to have a substantially V-shaped cross section on each side of a coil center line. Still another suitable excitation coil may be of solenoidal shape, for example.

RF ballast 20 may comprise, for example, a Class-D power amplifier, such as the ballast described in commonly assigned, copending U.S. patent application of S. A. El-Hamamsy and J. C. Borowiec, Ser. No. 472,144, filed Jan. 30, 1990, which is hereby incorporated by reference. The Class-D ballast includes two switching devices connected in series with a dc power supply in a half-bridge configuration. In operation, the switching devices are driven alternately between cutoff and saturation such that one is conducting while the other one is turned off and vice versa. Hence, the Class-D ballast may be conveniently driven by a square wave signal.

As illustrated in FIG. 1, a resonant load network is coupled to the output of ballast 20. The resonant load network comprises the excitation coil 18 of HID lamp 10 and a tuning capacitor $C_p$ connected in parallel therewith. The parallel combination of capacitor $C_p$ and coil 18 functions as an impedance transformer to reflect the impedance of the arc discharge into the ballast load. A blocking/tuning capacitor $C_s$ is connected in series with the parallel combination of coil 16 and capacitor $C_p$. In particular, capacitor $C_s$ is used both for blocking dc voltage and for resonant circuit tuning. As described in the El-Hamamsy and Borowiec patent application, cited hereinabove, capacitors $C_s$ and $C_p$ are chosen to ensure impedance matching for maximum efficiency.

Gas probe starter 12 is illustrated as being of a type described in Roberts et al. U.S. patent application, Ser.

No. 622,247 (docket no. RD-19,981), cited hereinabove. In particular, gas probe starter 12 comprises a starting electrode 30 coupled to a starting chamber 32 which is attached to the outer wall of arc tube 16 and contains a gas. The gas in starting chamber 32 may comprise, for example, a rare gas at a pressure in the range from approximately 0.5 to 500 torr, with a preferred range being from approximately 5 to 40 torr. Preferably, the gas in chamber 32 is at a low pressure relative to that of the arc tube fill in order to promote even easier starting. In an exemplary HID lamp system, a suitable arc tube fill pressure may be approximately 200 torr while that of the gas in chamber 32 may be approximately 20 torr. It is to be understood, however, that the starting circuit of the present invention may be used with other suitable types of starting probes, such as the gas probe starter described in the Duffy et al. patent application, Ser. No. 622,026 (docket LD-10,087), or a fixed foil electrode of the type described in the El-Hamamsy and Thomas U.S. patent application, Ser. No. 527,500, cited hereinabove. Still other suitable starting electrodes may be movable, if desired, such as those described in: Witting U.S. Pat. No. 4,902,937; Witting U.S. Pat. No. 4,894,590; and Borowiec U.S. Pat. No. 4,894,589, all cited hereinabove.

The starting circuit of the present invention comprises a resonant LC circuit of variable impedance including the series combination of a variable inductance and the parasitic capacitance between the starting probe and the excitation coil. In one preferred embodiment, as shown in FIG. 1, the variable inductance of starting circuit 14 comprises the parallel combination of an inductor $L_r$ and a variable, or tuning, capacitor $C_2$, the parallel combination of inductor $L_r$ and capacitor $C_2$ being coupled in series with the parasitic capacitance $C_1$ between starting probe 12 and excitation coil 18.

In accordance with one preferred embodiment of the present invention, capacitor $C_2$ comprises a dynamically variable capacitor, the capacitance of which is automatically varied during lamp-starting. Initially, capacitor $C_2$ is automatically varied to ignite a glow discharge in starting chamber 32. Thereafter, because the impedance of the starting circuit changes as the glow discharge is ignited, the tuning capacitor is again automatically tuned to ensure that a sufficiently high starting voltage is capacitively coupled from chamber 32 to the arc tube to initiate an arc discharge therein.

A suitable dynamically variable capacitor is described in commonly assigned U.S. patent application of S. A. El-Hamamsy and J. C. Borowiec, Ser. No. 534,574, filed June 7, 1990, which patent application is incorporated by reference herein. According to the El-Hamamsy and Borowiec application, capacitance may be varied by employing piezoelectric actuating means for moving a movable capacitor plate with respect to a fixed capacitor plate. As a result, capacitance changes in inverse proportion to the distance moved. Such a capacitor may be controlled either discretely for movement between predetermined positions or continuously for continuous movement over a range of positions. Either type of control is suitable in the starting circuit of the present invention. Other suitable capacitors are variable by means of a solenoid, for example.

Figure 2:
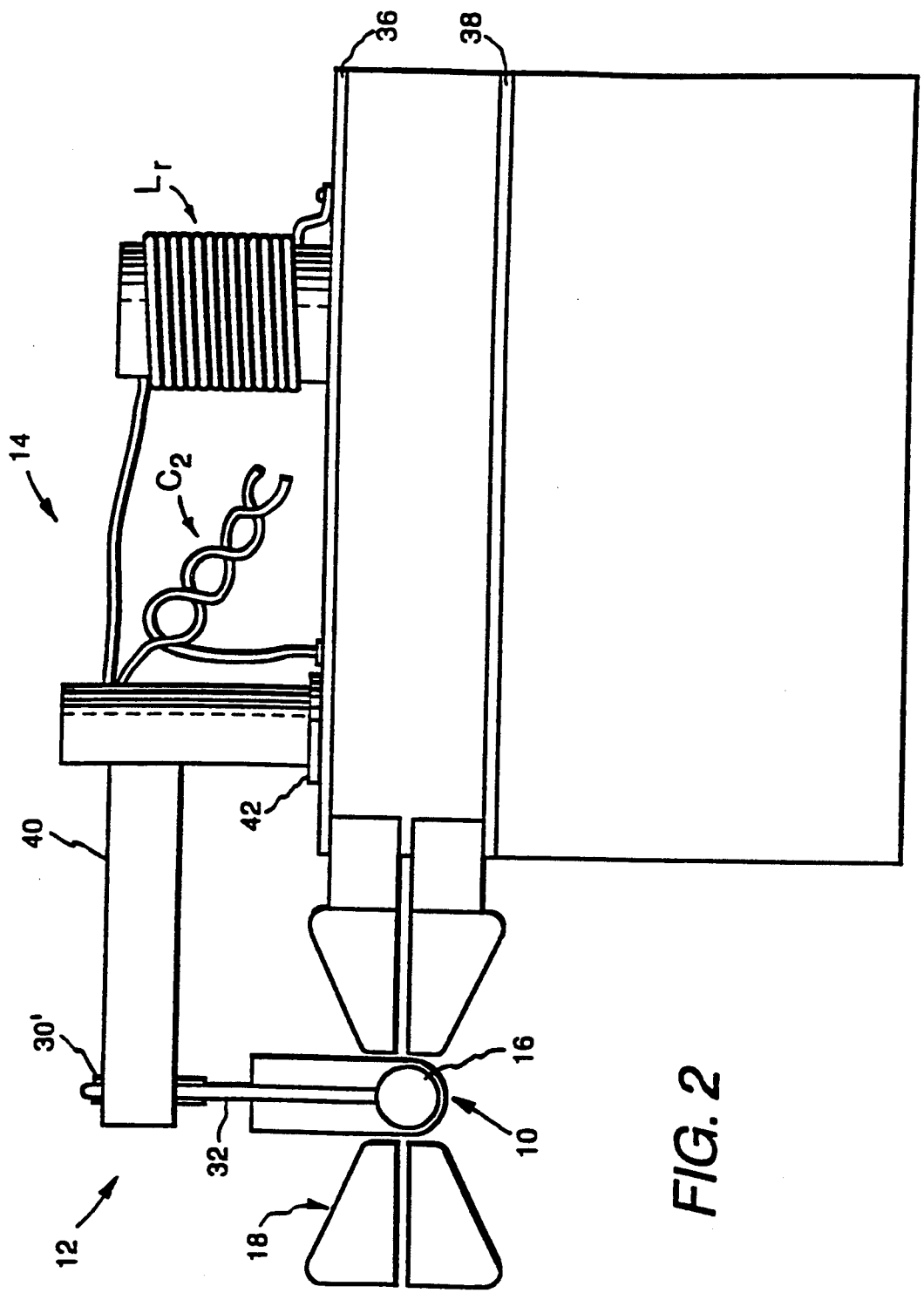
FIG. 2 illustrates a preferred implementation of the HID lamp system of FIG. 1 including a starting circuit of the present invention.

FIG. 2 illustrates a preferred implementation of the HID lamp system of FIG. 1 including starting circuit 4. For purposes of illustration, excitation coil 18 is shown as comprising a two-turn coil of the type described in the Farrall patent application, Ser. No. 493,266, cited hereinabove. As illustrated, conductive plates 36 and 38 of parallel capacitance $C_p$ at the output of ballast 20 (FIG. 1) preferably comprise heat sink plates for removing excess heat from excitation coil 18. For purposes of illustration, plates 36 and 38 are shown as being L-shaped in FIG. 2. An exemplary integrated heat sink and capacitor structure is the subject of commonly assigned U.S. patent application of J. C. Borowiec and S. A. El-Hamamsy, Ser. No. 472,144, cited hereinabove. Another exemplary integrated heat sink and capacitor structure is the subject of commonly assigned U.S. patent application of G. A. Farrall and J. C. Borowiec, Ser. No. 586,927, filed Sept. 24, 1990, which patent application is incorporated by reference herein. As shown in FIG. 2, tuning capacitor $C_2$ and inductor $L_r$ are mounted on plate 36, which is coupled to ground. A simple implementation of tuning capacitor $C_2$ is shown as comprising a pair of wires twisted together, the value of capacitor $C_2$ being changed merely by twisting the wires more or less, as needed. The parallel combination of capacitor $C_2$ and inductor $L_r$ is coupled to gas probe starter 12, which includes a foil electrode 30' disposed about chamber 32 via a clamping fixture 40 which is insulated from plate 36 by insulation 42.

Figure 3:
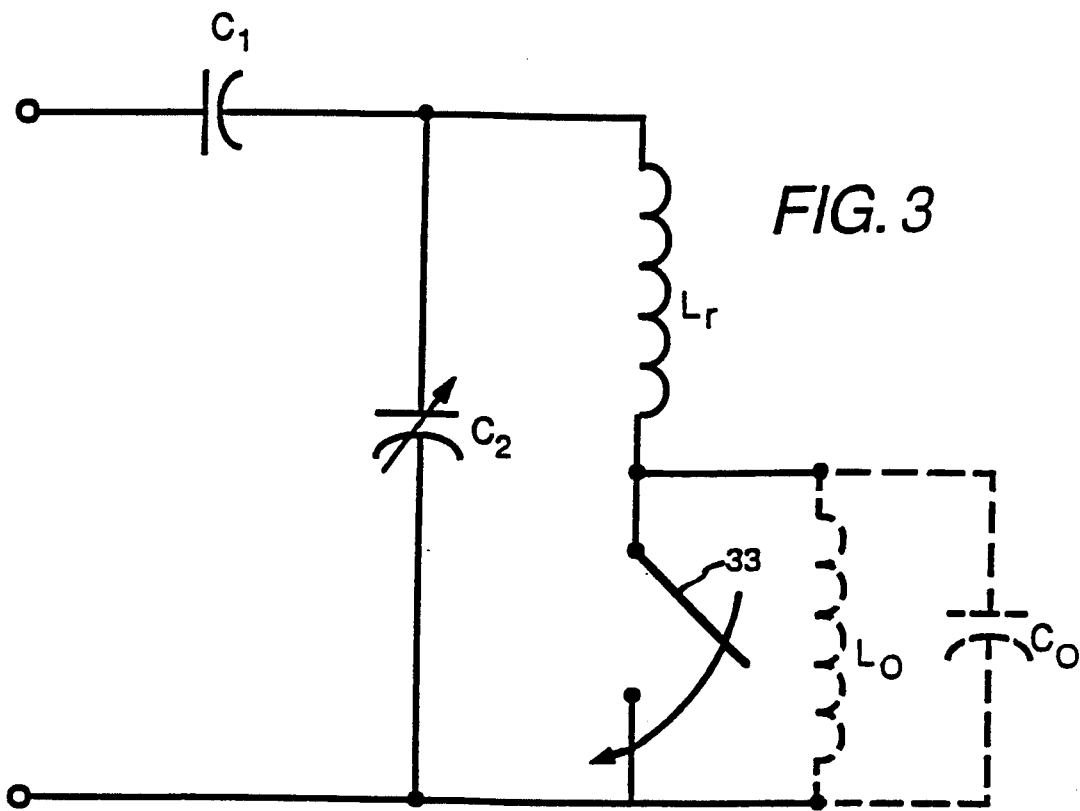
FIG. 3 is a schematic illustration of an alternative embodiment of the starting circuit of FIG. 1.

If desired, a switch, or a parallel combination of a switch 33 and an additional resonant circuit $L_o$ and $C_o$, as illustrated in FIG. 3 and described in the Cocoma et al. patent application, Ser. No. 622,024 (docket RD-20,228), cited hereinabove, may be coupled in series with the inductor. Initially, the switch is closed. However, after the lamp has started, the switch is opened in order to ensure that the circuit becomes sufficiently detuned to extinguish the glow discharge in chamber 32.

Figure 4A:
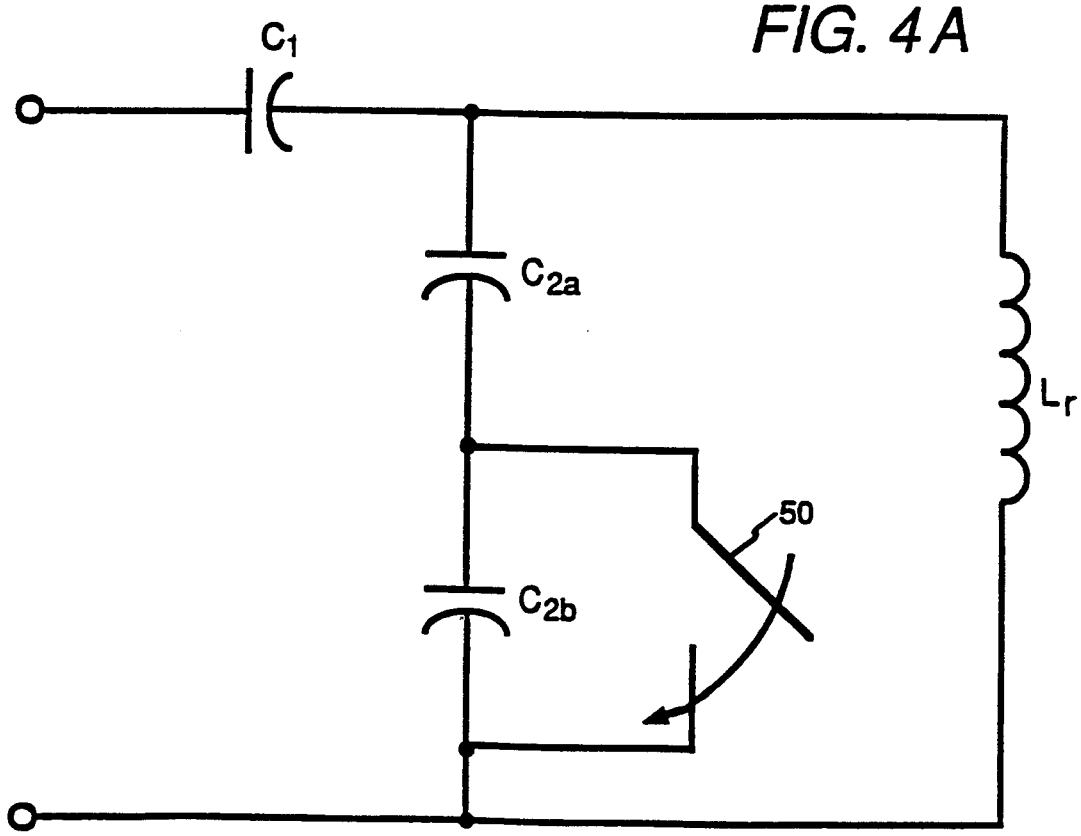
FIGS. 4A and 4B are schematic illustrations of other alternative embodiments of the starting circuit of the present invention.
Figure 4B:
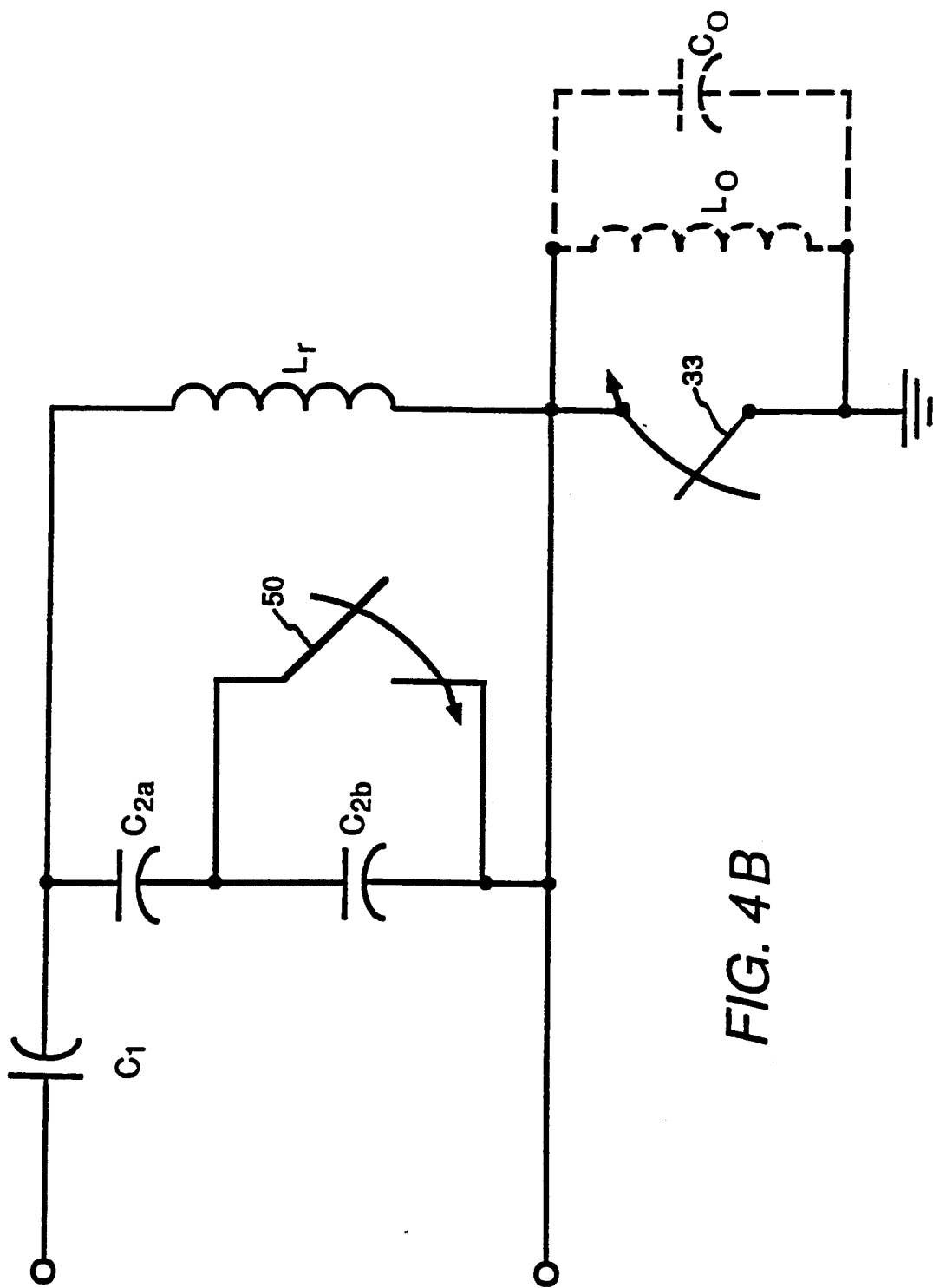

FIG. 4A illustrates another preferred embodiment of the two-stage resonant starting circuit of the present invention wherein the tuning capacitor comprises two capacitors $C_{2a}$ and $C_{2b}$ coupled in series with each other and a switch 50 coupled in parallel with capacitor $C_{2b}$. Initially, switch 50 is closed, the circuit being tuned to ensure a sufficiently high starting voltage to ignite a glow discharge in chamber 32 (FIG. 1). After the glow discharge has been ignited, and hence the impedance of the starting circuit has been changed (i.e., the capacitance of the starting circuit has increased by adding the capacitance of the glow discharge), the switch is opened, electrically coupling capacitor $C_{2b}$ in series with capacitor $C_{2a}$. The capacitance L of capacitor $C_{2b}$ should be chosen to ensure that a second resonance is achieved whereby a sufficiently high starting voltage is capacitively coupled from the glow discharge chamber to the arc tube to initiate an arc discharge therein. Furthermore, a switch 33, or a parallel combination of a switch 33 and an additional resonant circuit $L_o$ and $C_o$, such as those illustrated in FIG. 4b, may be coupled in series with the parallel combination of inductor $L_r$ and capacitors $C_{2a}$ and $C_{2b}$, if desired, in order to ensure that the starting circuit becomes sufficiently detuned by opening switch 33 after lamp-starting to extinguish the glow discharge in chamber 32.

Figure 5A:
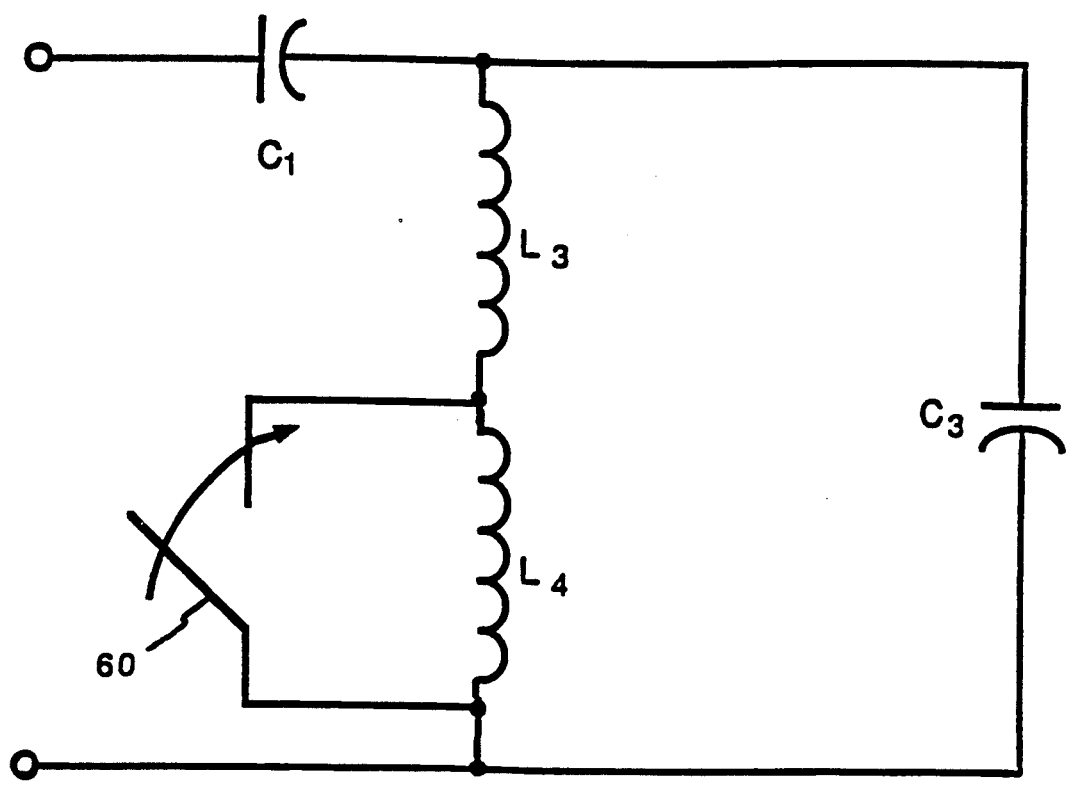
FIGS. 5A and 5B are schematic illustrations of still other alternative embodiments of the starting circuit of the present invention.
Figure 5B:
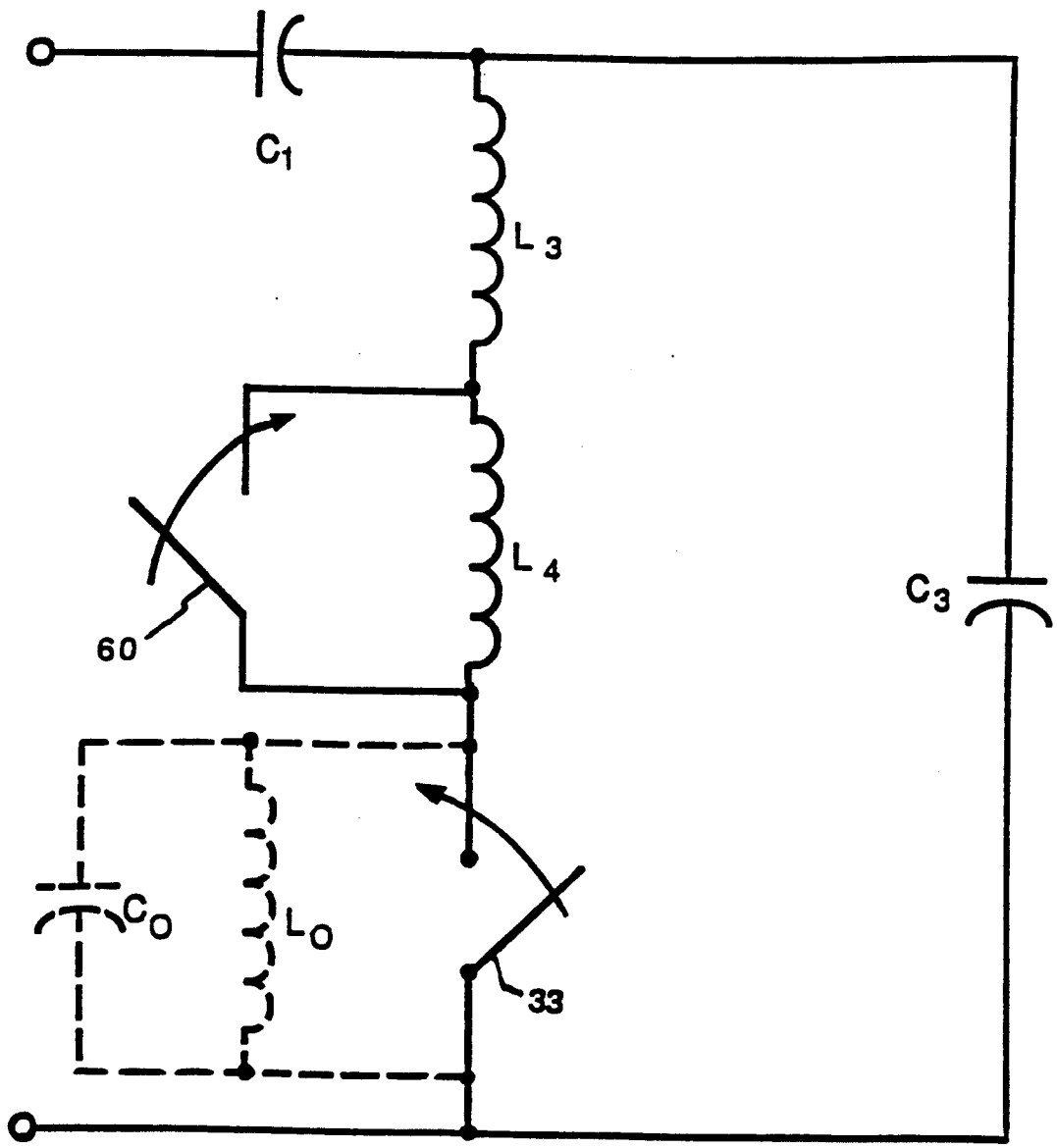
Figure 6A:
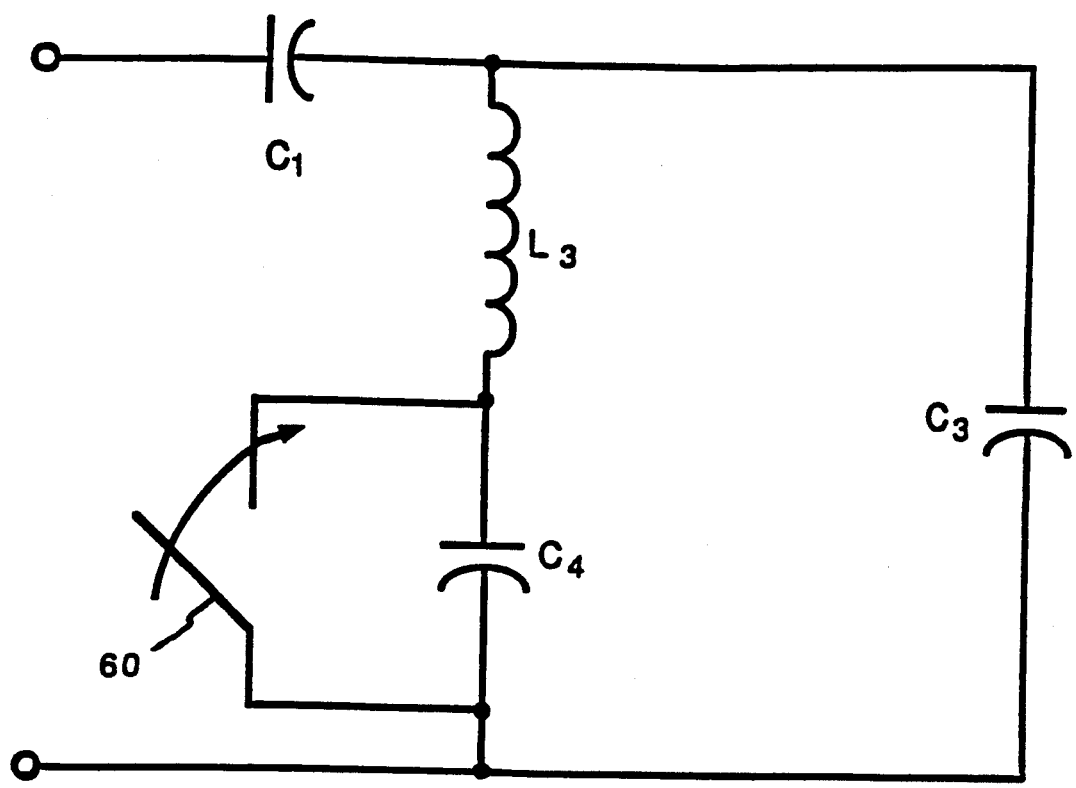
FIGS. 6A and 6B are schematic illustrations of yet other alternative embodiments of the starting circuit of the present invention.

Still other alternative embodiments of the two-stage resonant starting circuit of the present invention are illustrated in FIGS. 5 and 6 wherein a fixed capacitor $C_3$ is coupled in parallel with a tuning inductor which comprises a fixed inductor $L_3$ coupled in series with the parallel combination of either another fixed inductor $L_4$ and a switch 60 (FIG. 5A) or another fixed capacitor $C_4$ and a switch 60 (FIG. 6A). Initially, switch 60 is closed, the circuit being tuned to ensure a sufficiently high starting voltage to ignite a glow discharge in chamber 32 (FIG. 1). After the glow discharge has been ignited, and hence the impedance of the starting circuit has been changed (i.e., the capacitance of the starting circuit has increased by adding the capacitance of the glow discharge), the switch is opened, electrically coupling either capacitor $C_4$ (FIG. 6A) or inductor $L_4$ (FIG. 5A) in series with inductor $L_3$. The reactance of either $C_4$ or $L_4$ should be chosen to ensure that a second resonance is achieved whereby a sufficiently high starting voltage is capacitively coupled to the arc tube to initiate an arc discharge therein.

Figure 6B:
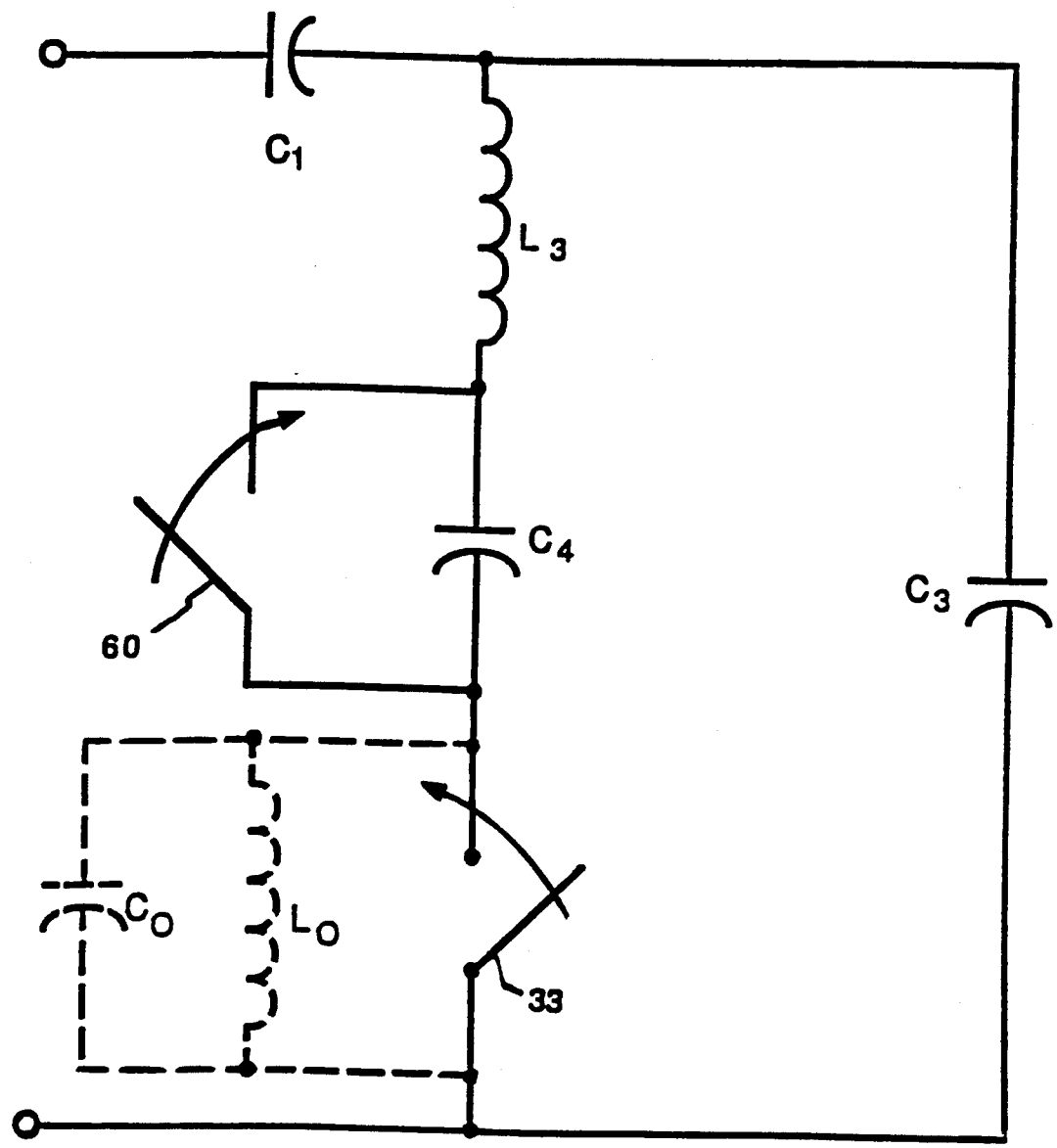

As illustrated in FIGS. 5B and 6B, a glow suppression circuit comprising switch 33, or the parallel combination of switch 33 and the additional resonant circuit $L_o$ and $C_o$, may be coupled in series with the tuning inductor, if desired, in order to ensure that the starting circuit becomes sufficiently detuned by opening switch 33 after lamp-starting to extinguish the glow discharge in chamber 32 (FIG. 1).

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An electrodeless high intensity discharge lamp system, comprising:
   a light-transmissive arc tube for containing a fill;
   an excitation coil disposed about said arc tube and coupled to a radio frequency power supply for exciting an arc discharge in said fill;
   a gas probe starter disposed proximate to said arc tube and establishing a parasitic capacitance between said excitation coil and said gas probe starter, said gas probe starter including a starting chamber for containing a gas, said starting chamber being attached to the outer wall of said arc tube; and
   resonant circuit means for receiving a radio frequency signal from said radio frequency power supply and providing a first resonant starting voltage to said gas probe starter of sufficient magnitude to initiate a glow discharge in said starting chamber, said resonant circuit means having a variable impedance and including a parallel combination of a resonant inductor and a resonant capacitor, the impedance of said parallel combination being tunable, said parallel combination further being coupled in series with the parasitic capacitance between said excitation coil and said gas probe starter, said resonant circuit means further including returning means for retuning said resonant circuit means after initiation of said glow discharge in said starting chamber in order to provide a second resonant starting voltage of sufficient magnitude to initiate the arc discharge in said arc tube.

2. The lamp system of claim 1 wherein said resonant capacitor comprises an automatically variable capacitor, said variable capacitor being tuned so that said resonant circuit means can initiate a glow discharge in said starting chamber and thereafter being tuned again, depending on the changing impedance of said resonant circuit means, so as to ensure initiation of the arc discharge in said arc tube.

3. The lamp system of claim 2, further comprising detuning means coupled to said resonant circuit means for detuning said starting circuit after initiation of the arc discharge.

4. The lamp system of claim 3 wherein said detuning means comprises a detuning switch coupled in series with said resonant inductor such that said detuning switch is opened after initiation of the arc discharge.

5. The lamp system of claim 4, further comprising an additional resonant circuit coupled in parallel with said detuning switch.

6. The lamp system of claim 5 wherein said additional resonant circuit comprises a parallel LC circuit.

7. The lamp system of claim 1 wherein said retuning means comprises a parallel combination of a second capacitor and a retuning switch coupled in series with said resonant capacitor, said retuning switch being closed until a glow discharge is initiated in said starting chamber and being opened upon initiation of said glow discharge to ensure initiation of the arc discharge in said arc tube.

8. The lamp system of claim 7, further comprising detuning means coupled to said resonant circuit means for detuning said starting circuit after initiation of the arc discharge.

9. The lamp system of claim 8 wherein said detuning means comprises a detuning switch coupled in series with said resonant inductor such that said detuning switch is opened after initiation of the arc discharge.

10. The lamp system of claim 9, further comprising an additional resonant circuit coupled in parallel with said detuning switch.

11. The lamp system of claim 10 wherein said additional resonant circuit comprises a parallel LC circuit.

12. The lamp system of claim 1 wherein said retuning means comprises a parallel combination of a second inductor and a retuning switch coupled in series with said resonant inductor, said retuning switch being closed until a glow discharge is initiated in said starting chamber and being opened upon initiation of said glow discharge to ensure initiation of the arc discharge in said arc tube.

13. The lamp system of claim 12, further comprising detuning means coupled to said resonant circuit means for detuning said starting circuit after initiation of the arc discharge.

14. The lamp system of claim 13 wherein said detuning means comprises a detuning switch coupled in series with said resonant inductor such that said detuning switch is opened after initiation of the arc discharge.

15. The lamp system of claim 14, further comprising an additional resonant circuit coupled in parallel with said detuning switch.

16. The lamp system of claim 15 wherein said additional resonant circuit comprises a parallel LC circuit.

17. The lamp system of claim 1 wherein said retuning means comprises a parallel combination of a second capacitor and a retuning switch coupled in series with said resonant inductor, said retuning switch being closed until a glow discharge is initiated in said starting chamber and being opened upon initiation of said glow discharge to ensure initiation of the arc discharge in said arc tube.

18. The lamp system of claim 17, further comprising detuning means coupled to said resonant circuit means for detuning said starting circuit after initiation of the arc discharge.

19. The lamp system of claim 18 wherein said detuning means comprises a detuning switch coupled in series with said resonant inductor such that said detuning switch is opened after initiation of the arc discharge.

20. The lamp system of claim 19, further comprising an additional resonant circuit coupled in parallel with said detuning switch.

21. The lamp system of claim 20 wherein said additional resonant circuit comprises a parallel LC circuit.

* * * * *